United States Patent [19]

Matsuda et al.

[11] Patent Number: 5,189,527
[45] Date of Patent: Feb. 23, 1993

[54] FACSIMILE COMMUNICATION DEVICE

[75] Inventors: Toshihiro Matsuda; Daisuke Moriya, both of Yamatokoriyama, Japan

[73] Assignee: Sharp Kabushiki Kaisha, Osaka, Japan

[21] Appl. No.: 740,880

[22] Filed: Jul. 31, 1991

Related U.S. Application Data

[63] Continuation of Ser. No. 555,649, Jul. 23, 1990, abandoned.

[30] Foreign Application Priority Data

Jul. 28, 1989 [JP] Japan .................................. 1-197277

[51] Int. Cl.$^5$ ............................................. H04N 1/00
[52] U.S. Cl. ................................... 358/440; 358/400; 358/444
[58] Field of Search ............... 358/400, 402, 403, 404, 358/407, 440, 444, 488, 498

[56] References Cited

U.S. PATENT DOCUMENTS

| | | | |
|---|---|---|---|
| 4,502,080 | 2/1985 | Tsuda | 358/256 |
| 4,646,160 | 2/1987 | Iizuka et al. | 379/100 |
| 4,833,705 | 5/1989 | Kobayashi | 379/93 |
| 4,878,123 | 10/1989 | Miura et al. | 358/444 |
| 4,920,560 | 4/1990 | Kageyama | 358/440 |
| 5,001,572 | 3/1991 | Hashimoto et al. | 358/440 |

FOREIGN PATENT DOCUMENTS 0244869 11/1987 European Pat. Off. .
0310001 4/1989 European Pat. Off. .

Primary Examiner—Edward L. Coles, Sr.
Assistant Examiner—Thomas D. Lee
Attorney, Agent, or Firm—Nixon & Vanderhye

[57] ABSTRACT

A facsimile communication device includes keys for designating identifying data of another facsimile communication device to or from which image data of an original document should be transmitted; an original document sensor for detecting whether or not the original document to be transmitted has been set; and a controller for reading outputs from the keys and original document sensor and controlling data transmission; if the original document has been set when the keys designate the identifying data, another facsimile communication device corresponding to the identifying data and to which the image data should be transmitted being called to receive the image data of the original document transmitted by the controller, and if the original document has not been set when the keys designate the identifying data, another facsimile communication device corresponding to the identifying data and from which the image data should be transmitted being called and required by the controller that the image data should be transmitted from it.

7 Claims, 5 Drawing Sheets

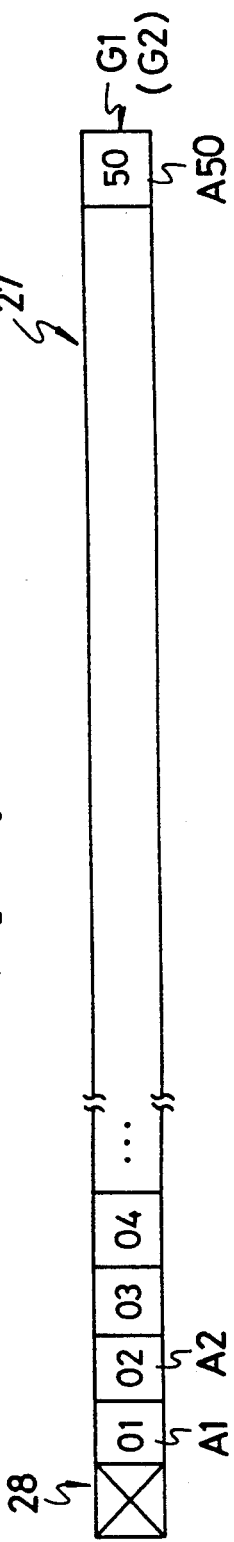

FACSIMILE COMMUNICATION DEVICE

This is a continuation-in-part of application Ser. No. 07/555,649, filed Jul. 23, 1990, now abandoned.

BACKGROUND OF THE INVENTION

1. Field of the Invention

The present invention relates to a facsimile communication device.

2. Description of the Related Art

A facsimile communication device which is used as a sort of communication device is in wider use of transferring image data, compared with a communication device like a telephone used only for transmitting sound. In recent years, this type of facsimile communication device has widely employed a function named "sequential data concurrent transmission". The sequential data concurrent transmission is the function that, by depressing, for example, a sequential data concurrent transmission button, a facsimile communication device storing a plurality of facsimile numbers of other facsimile communication devices reads an original document set in the device and stores its data in an image memory to sequentially transfer contents of the image memory to the plurality of facsimile devices. Also widely employed has been a function named "transmission request", which is the function that a facsimile communication device designates one or more other facsimile communication devices and makes them read an original document set in the former and transmit image data through remote control.

A conventional facsimile communication device having such functions as stated above comprises operating means like a sequential data transmission button, a transmission request button and the like, separately; and hence, with such devices, there arises the problem that its structure is complicated and its operability degrades.

As a similar example of the art, a facsimile control system (Japanese Unexamined Patent Publication No. 160262/1982) is known, in which simply turning on a single switch for polling enables two functions, "permission of polling-transmission" and "commencement of polling-receiving", and the "permission of polling-transmission" is automatically released when the polling-transmission is normally completed, so as to prevent malfunctions caused by the next operation, while the condition of the "permission of polling-transmission" is retained when the polling-transmission is abnormally interrupted, so as to enable the recommencement of receiving by calling a receiving station, or a remote receiver, again. Also, a facsimile device capable of switching between a polling-standby mode and a polling-receiving mode (Japanese Unexamined Patent Publication No. 148464/1984) is known.

As a related prior application by the applicant of the present invention, there are some facsimile communication devices: An embodiment of the devices has an automatic receiving function capable of satisfying both of a demand for telephonic communication and a demand for facsimile communication from a transmitter (Japanese Unexamined Patent Publication Nos. 90657/1989 and 90661/1989). Another embodiment has an automatic receiving function capable of satisfying both of a demand for telephonic communication and a demand for facsimile communication from a transmitter and capable of satisfying a demand for facsimile communication from a manual dialing facsimile communication device (Japanese Unexamined Patent Publication No. 90658/1989). Still another embodiment has an automatic receiving function capable of satisfying both of a demand for telephonic communication and a demand for facsimile communication from a transmitter and capable of informing the transmitting station that the device has satisfied the demand for telephonic communication (Japanese Unexamined Patent Publication No. 90659/1989). Yet another embodiment is capable of satisfying both of a demand for telephonic communication and a demand for facsimile communication from a transmitter, and is capable of informing the operators on both transmitting and receiving parties that the device of the receiving station is in use for satisfying the demand for telephonic communication (Japanese Unexamined Patent Publication No. 90660/1989).

SUMMARY OF THE INVENTION

It is an object of the present invention to provide a facsimile communication device of which system architecture is simplified and of which operability is highly improved.

Accordingly, the present invention provides a facsimile communication device comprising designating means for designating identifying data of another facsimile communication device to or from which image data of an original document should be transmitted; original document detecting means for detecting whether or not the original document to be transmitted has been set; and control means for reading outputs from the designating means and original document detecting means and controlling data transmission; if an original document has been set when the designating means designates identifying data, the another facsimile communication device corresponding to the identifying data and to which image data should be transmitted being called to receive the image data of the original document transmitted by the control means, and if the original document has not been set when the designating means designates the identifying data, the another facsimile communication device corresponding to the identifying data and from which the image data should be transmitted being called and required by the control means that the image data should be transmitted from it.

With a facsimile communication device thus structured according to the present invention, the designating means designates the identifying data of other facsimile communication devices, and then the original detecting means detects the existence of the original documents in the devices, where the control means receives outputs from these means. If the detecting means detects the existence of the original document when the designating means designates the identifying data, the control means calls other facsimile communication devices to which image data should be transmitted, corresponding to the identifying data; and image data of the original document is transferred to those facsimile communication devices. If the original document detecting means detects the absence of the original document when the designating means designates the identifying data, the control means calls other facsimile devices from which image data should be transmitted, corresponding to the identifying data; and those facsimile communication devices are asked to transmit image data.

In this way, there is no need to provide individual input means such as buttons for a function of transmitting image data to the facsimile communication devices to which image data should be transmitted, for a function of asking the facsimile communication devices from which image data should be transmitted to transmit image data, etc., whereby its system architecture can be considerably simplified, the necessity of setting and performing the individual functions is eliminated, and the operability is improved.

BRIEF DESCRIPTION OF THE DRAWINGS

FIG. 3 is a diagram for explaining contents stored in a RAM;

FIG. 4 is a diagram for explaining contents stored in a group area in the RAM.

DESCRIPTION OF THE PREFERRED EMBODIMENT

Figure 1:
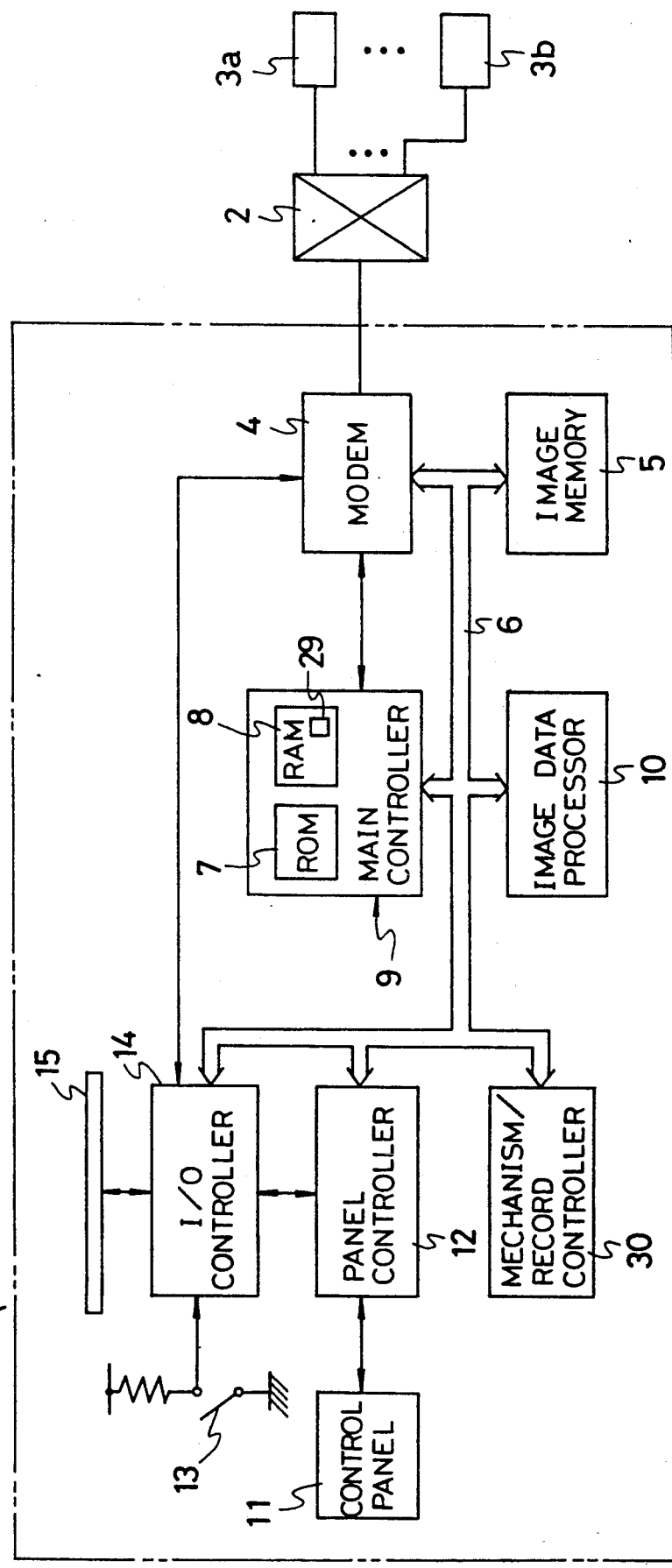
FIG. 1 is a block diagram for explaining a system architecture of an embodiment according to the present invention.

FIG. 1 is a block diagram for explaining a system architecture of an embodiment according to the present invention. Referring to FIG. 1, a facsimile communication device (shortened as "facsimile device" hereinafter) 1 of the embodiment according to the present invention is connected to a plurality of facsimile devices 3a, ..., 3b (reference numeral "3" denotes them in general) through a telephone network 2. The facsimile device 1 of this embodiment fulfills "sequential data concurrent transmission" which is a function of sequentially transmitting image data of an original document that the facsimile device 1 reads to the plurality of facsimile device 3 connected to the facsimile device 1 and "transmission request" which is a function of polling the facsimile devices 3 to make the facsimile devices 3 read the original document set therein and transfer image data to the facsimile device 1.

The facsimile device 1 includes a modem 4 for modulating/demodulating image data transferred to and from the telephone network 2 and an image memory 5 for storing image data obtained by reading an original document or received image data. The modem 4 and the image memory 5 are connected through a bus line 6 to a main control unit 9 which is a control means including a ROM (Read Only Memory) 7 storing a program for determining the operation of the facsimile device 1 and fixed data, a RAM (Random Access Memory) 8 temporarily storing data required for the operation of the facsimile device 1, a microprocessor and the like.

The bus line 6 connects to an image data processing unit 10 for processing image data, a panel control unit 12 for controlling a control panel 11 provided with various keys as mentioned below, a mechanism/record control unit 30 for controlling the rotation of a platen roller and the like, an original document sensor 13 as original document detecting means provided cooperatively with an original document holding member for detecting whether or not an original document has been set in the original document holding member, and an input/output control unit 14 for inputting data of the original document.

The original document sensor 13 may be an optical detecting means composed of mechanical switches such as limit switches, light emitting elements and light receiving elements. The input/output control unit 14 is connected to reading means 15 formed of a line image sensor or the like, for reading the original document.

Figure 2:
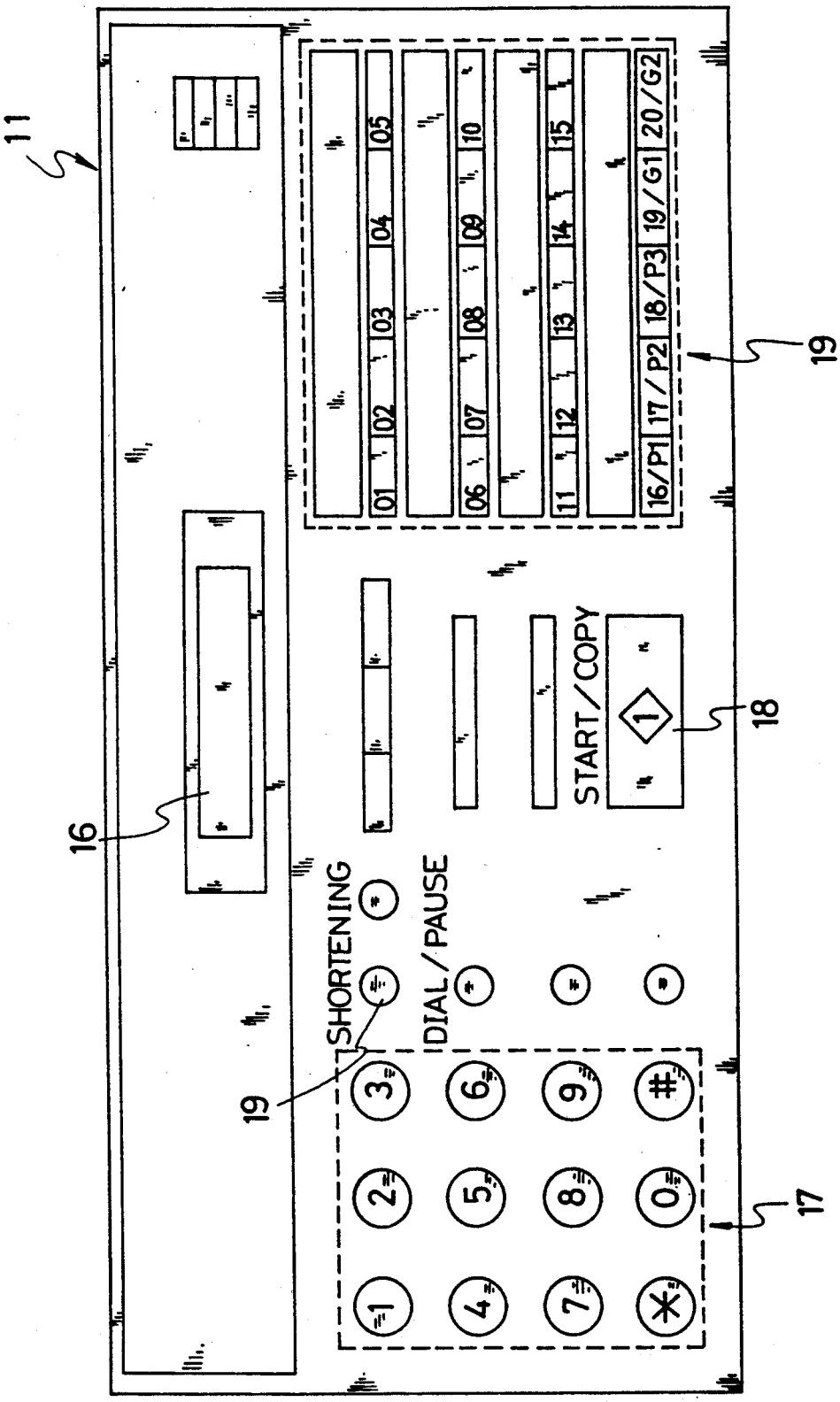
FIG. 2 is a plan view showing a control panel.

FIG. 2 is a plan view showing the control panel 11. Referring to FIG. 2, the control panel 11 includes a display unit 16 formed, for example, of a liquid crystal display element, register keys 17 including numeral "0" to "9" keys, a "*" key, a "#" key, etc., a start key 18 for starting the operation, for example, of reading the original document and then transferring image data, and a plurality of (20 in this embodiment) keys K1 to K20 (reference numeral K denotes them in general, if necessary) as designating means for designating identifying data of other facsimile devices 3 to or from which image data should be transmitted. Each of the keys K1 to K20 are correlated with facsimile numbers which are identifying data with the facsimile devies 3a, ..., 3b, using the register keys 17, and the relations are stored in the RAM 8.

When one of the keys K1 to K20 is depressed, one of the facsimile numbers, which has been correlated with the depressed key and stored, is read, and facsimile transmission starts automatically; and this is termed as "direct transmission" hereinafter. The control panel 11 also includes a shortening key 19. When a two-digit number in a predetermined range is inputted by the register keys 17 with the shortening key 19 depressed, a facsimile number stored beforehand corresponding to the number is read, and facsimile transmission is able to start. In this embodiment, the keys K19 and K20, for example, among the keys K1 to K20 function to store a plurality of facsimile numbers.

FIG. 3 is a diagram for explaining contents stored in the RAM 8 of the facsimile device 1. Referring to FIG. 3, the RAM 8 is provided with an area in which facsimile numbers and the like are stored; for example, a range of addresses 01 to 99. Twenty rows P1 to P20 corresponding to the addresses 01 to 20 constitute a direct area 25 which corresponds to the above direct transmission function. These rows include a facsimile number column 20, a telephone number column 21 and a column 22 of a name of a receiving station where character data and the like are stored for displaying the name of the receiving station on the display unit 16.

Further, when image data cannot be transmitted due to abnormality in the line or in use of a facsimile communication device having a facsimile number corresponding to the facsimile number column 20, a facsimile number column 23 where a facsimile number of a facsimile communication device for receiving image data instead and a column 24 of a name of a receiving station are provided. On the other hand, in the addresses 21 to 99, there is provided a shortened number area 26 corresponding to a shortened signal generating function following a direct area 25 corresponding to the above-mentioned direct transmission function, which are provided with rows P21 to P99 corresponding to the addresses 21 to 99 and with the above-mentioned facsimile number column 20, the telephone number column 21 and the column 22 of a name of a receiving station.

When facsimile numbers and the like correlated with the keys K1 to K20 are set as shown in FIG. 3, by depressing one of the keys K1 to K20, a facsimile number or a telephone number in one of the rows P1 to P20 is read, and facsimile communication or telephone communication can be established. If a facsimile device in the receiving station is in use, the line is connected to a facsimile number stored in the facsimile number column 23, and then image data is transferred. When a two-digit number is inputted using the register keys 17 after the shortening key 19 is depressed, a facsimile number or a telephone number in one of the rows P21 to P99 is read, and thus image data can be transferred or telephone communication can be established.

FIG. 4 is a diagram showing contents of a group storage area 27 stored in the RAM 8. The group storage area 27 includes an identifier sector 28 used as a flag showing whether or not the key K19 or K20 is provided as a so-called group key including a plurality of facsimile numbers, and 50 shortened number data sectors A1 to A50.

By depressing the key K19 thus correlated with the plurality of facsimile numbers, the shortened number data set in the shortened number data sectors A1 to A50 is read, an address related to the shortened number area 26 in the RAM 8 is generated, and then image data can be transferred and telephone communication can be established.

Figure 5A:
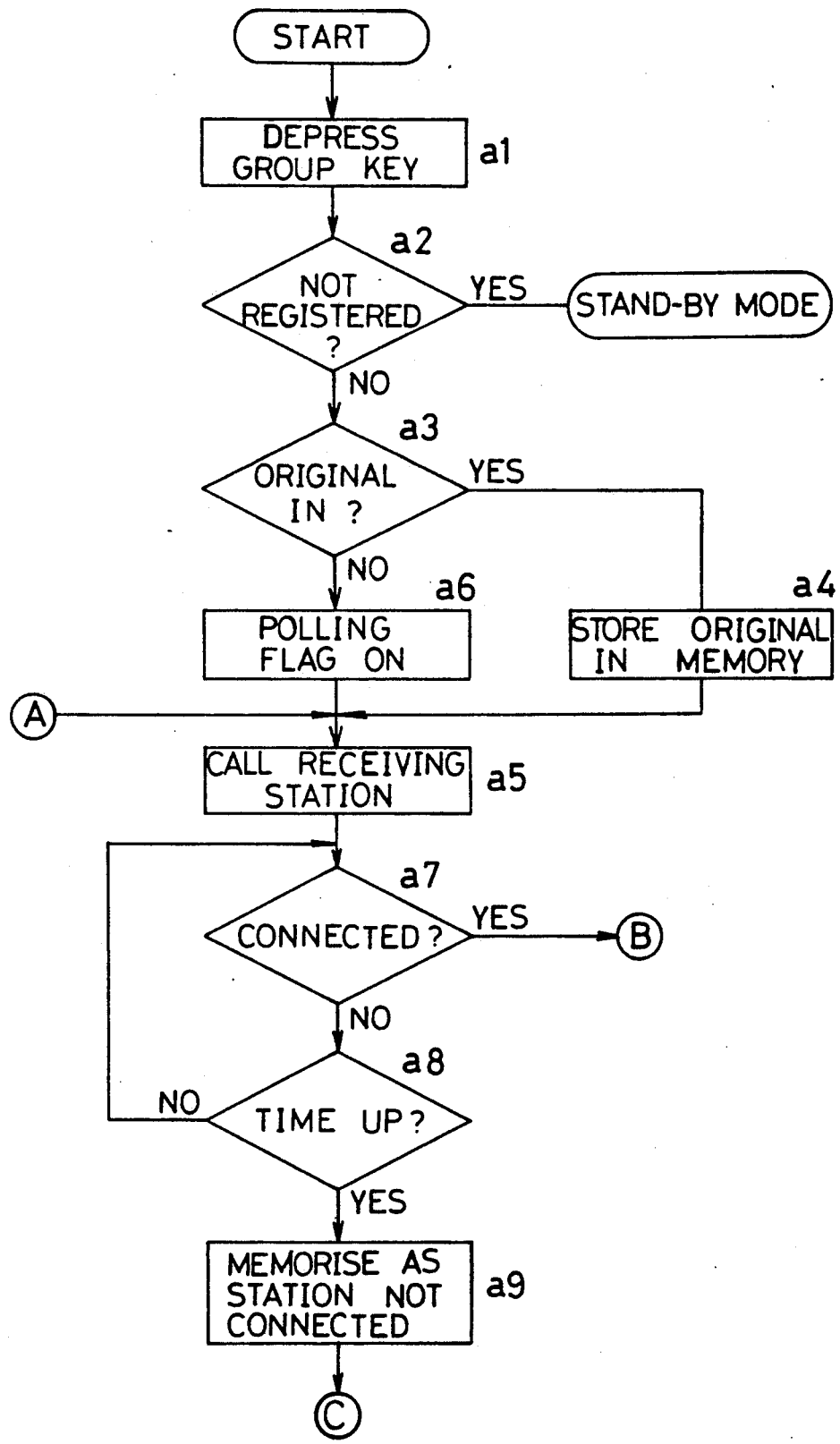
FIGS. 5(a) and 5(b) are flow charts for explaining the operation of the present invention.
Figure 5B:
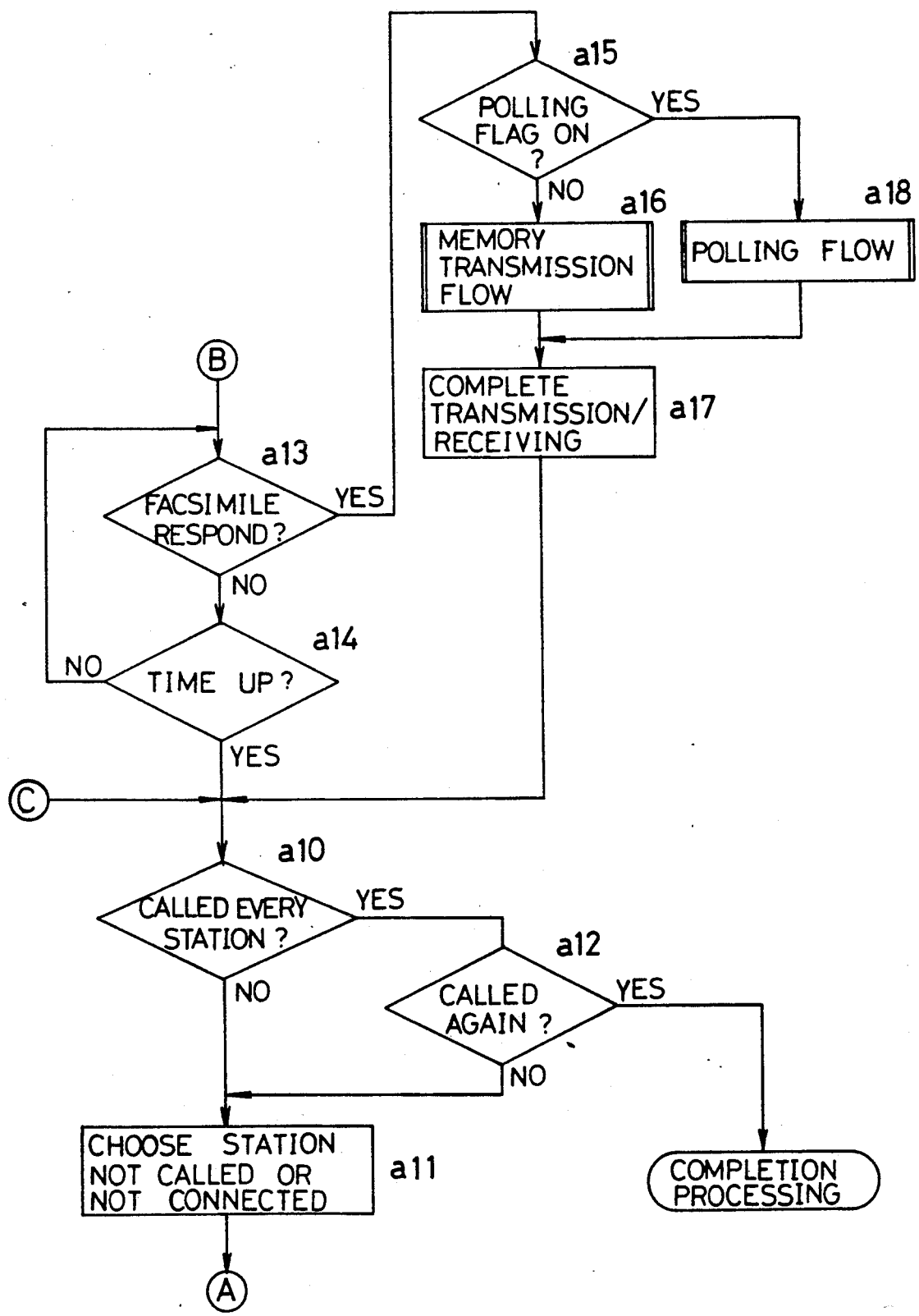

FIGS. 5(a) and 5(b) are flow charts for explaining the operation of this embodiment. The operation of this embodiment will be explained hereinafter in conjunction with FIGS. 5(a) and 5(b). At step a1, the key K20 or K19 is depressed. To detect that the key K19 or K20 is provided as a group key, a state of the identifier sector 28 is read. At step a2, it is judged whether or not shortened numbers and the like have registered in group sectors G1, G2 corresponding to the keys K19 and K20. If not registered, is turned to a standby state. If the answer is affirmative at step a2, the procedure proceeds to step a3, and the original document sensor 13 detects if the original document has been set. If detected, image data of the original document is stored in the image memory 5 at step a4, and the procedure proceeds to step a5. If the answer is negative at step a3, the procedure proceeds to step a6. At step a6, a flag is set in a polling flag sector 29, and the procedure proceeds to step a5.

At step a5, one of the shortened numbers set as shown in FIG. 4 is stored in a group sector G1, the shortened number is converted into an address in the shortened number area in the RAM 8 to read a facsimile number at that address, and thus the facsimile devices 3 are called. At step a7, it is judged whether or not the connection is established. If the answer is negative, the procedure proceeds to step a8, and it is judged whether or not a predetermined period of time has elapsed. The lapse of the predetermined period of time means that the line cannot be connected to the receiving station, and thus the procedure proceeds to step a9. At step a9, the number of the receiving station is stored as a station which could not be connected.

Thereafter, the procedure proceeds to step a10, and it is judged whether or not the calling operation is completed with regard to all the shortened numbers set in the group sector G1. If the answer is negative, the procedure proceeds to step a11, and a shortened number in the group sector G1 which has not been called is read. Otherwise, the station which could not be connected at step a9 is chosen, the procedure proceeds to step a5. If the answer is affirmative at step a10, the procedure proceeds to step a12, and it is judged whether or not the facsimile devices 3 which were called but not connected because the line is busy has been called again. The answer is negative, the procedure proceeds to step a11, and the above-mentioned procedure is carried out again. If the answer is affirmative at step a12, such a sequential concurrent transmission is completed.

If the answer is affirmative at step a7 and the connection with the facsimile devices 3 are established, the procedure proceeds to step a13, and it is judged whether or not the facsimile devices 3 transmitted a facsimile response signal. If the answer is negative, the procedure proceeds to step a14, and it is judged whether or not a predetermined period of time has elapsed. If the answer is negative, the facsimile response signal is waited. If the answer is affirmative, the procedure proceeds to step a10.

If the answer is affirmative at step a13, the procedure proceeds to step a15, and it is judged whether or not a polling flag in the polling flag sector 29 is set. If the answer is negative, the original document was set at step a3, and image data in the image memory 5 is read. Thus, the procedure proceeds to step a16, and image data is transmitted to the facsimile devices 3 to which the connection was established at step a7.

At step a17, a final processing of data transmission/receiving is performed, and the procedure goes back to step a10. If the answer is affirmative at step a15, the procedure proceeds to step a18, and one of the facsimile devices 3 is caused to read the original documents set therein and transmit image data to the facsimile device 1. After that, the procedure proceeds to step a17, and the above-mentioned processing is carried out again.

As has been described, according to this embodiment, the shortened numbers are set as shown in FIG. 4. By depressing the keys K19, K20 used as the group keys, when the original document sensor 13 detects that the original document is set, the above-mentioned sequential concurrent transmission function is utilized to transfer image data to the facsimile devices 3 which correspond to the shortened number set in the key K19.

On the other hand, if the original document sensor 13 detects that the original document is not set when the key K19 is depressed, the main control unit 9 sequentially designates the facsimile devices 3 corresponding to a shortened dial number set in the key K19 as shown in FIG. 4, and then makes one of the facsimile devices 3 read the original document set therein and transmit image data read from the original document to the facsimile device 1. In this way, the transmission request operation is sequentially performed.

As stated above, according to the present invention, there is no need to provide operating means specific to each function, such as key switches for setting the facsimile device 1 in the transmission request mode and key switches for setting the same in the sequential concurrent transmission mode, whereby its system architecture is considerably simplified. Also, there is no need to use the above-mentioned individual operating means in performing the transmission request and the sequential concurrent transmission, whereby the operability of the facsimile device 1 is considerably enhanced.

As has been described, according to the present invention, when it is detected that an original document is set when keys are depressed, image data of the original document is transferred to a plurality of facsimile communication devices corresponding to the identifying data. When it is detected that the original document is not set when the keys are depressed, the facsimile devices corresponding to the identifying data are sequentially asked to transmit image data.

In this way, there is no need to provide individual input means such as buttons for a function of sequentially transmitting image data to a plurality of facsimile communication devices, for a function of sequentially asking the plurality of facsimile communication devices to transmit image data, etc., whereby its system architecture can be considerably simplified, the necessity of setting and performing the individual functions is eliminated, and the operability is improved.

What is claimed is:

1. A facsimile communication device capable of sending first image data corresponding to a first original document set therein and also capable of receiving other image data corresponding to other original documents emanating from other facsimile communication devices, said facsimile communication device, comprising:

group key means for selecting a plurality of said other facsimile communication devices in response to the operation of a group key;

designating means responsive to the operation of said group key means for sequentially designating identifying data of said selected plurality of other facsimile communication devices to which said first image data of said first original document should be transmitted or from which said other image data should be transmitted;

original document detecting means for detecting whether or not said first original document to be transmitted has been set; and control means directly responsive to said designating means and said detecting means for reading outputs from said designating means and original document detecting means and accordingly controlling data-transmission;

said control means operating so that if said first original document has been set when said designating means designates identifying data, said plurality of other facsimile communication devices corresponding to the identifying data and to which image data should be transmitted are sequentially called in response to the operation of said group key means to receive the first image data of the first original document, and if the first original document has not been set when said designating means designates the identifying data, said plurality of other facsimile communication devices corresponding to the identifying data and from which the other image data should be transmitted are sequentially called and said other image data is caused to be sequentially transmitted from said other devices; and said facsimile communicating device further including group storage means for storing said identifying data of a plurality of said other facsimile communication devices and for storing a data group including a plurality of shortened number data each of which is associated with one of said other facsimile communication devices, wherein each of the shortened number data are read out from the group storage means and cause said designating means to sequentially designate said selected plurality when said group key means is operated.

2. A device according to claim 1, wherein the identifying data is a facsimile number.

3. A device according to claim 1, wherein said designating means includes a plurality of keys each of which corresponds to each of facsimile numbers of a plurality of facsimile communication devices.

4. A device according to claim 3, further comprising a RAM for storing the facsimile numbers of said plurality of facsimile communication devices which correspond respectively to said plurality of keys.

5. A device according to claim 1, wherein said original document detecting means includes an original document sensor which is disposed in association with an original document holding member, for detecting whether or not the original document has been set in said original document holding member.

6. A device according to claim 1, wherein said control means reads outputs of said designating means and original document detecting means and controls data transmission such that, if the first original document has been set when said designating means designates the identifying data, other facsimile communication devices corresponding to said identifying data and to which the first image data should be transmitted are sequentially called to receive said first image data of the first original document sequentially transmitted thereto, and if the first original document has not been set when said designating means designates the identifying data, said other facsimile communication device corresponding to the identifying data and from which the image data should be transmitted are sequentially called and required by said control means to transmit the other image data associated with each such other device.

7. A facsimile communication device capable of sending first image data corresponding to a first original document set therein and also capable of receiving other image data corresponding to other original documents emanating from other facsimile communication devices, said facsimile communication device, comprising:

group key means for selecting a plurality of said other facsimile communication devices in response to the operation of a group key;

designating means responsive to the operation of said group key means for sequentially designating identifying data of said selected plurality of other facsimile communication devices to which said first image data of said first original document should be transmitted or from which said other image data should be transmitted;

original document detecting means for detecting whether or not said first original document to be transmitted has been set; and control means directly responsive to said designating means and said detecting means for reading outputs from said designating means and original document detecting means and accordingly controlling data-transmission;

said control means operating so that if said first original document has been set when said designating means designates identifying data, said plurality of other facsimile communication devices corresponding to the identifying data and to which image data should be transmitted are sequentially called in response to the operation of said group key means to receive the first image data of the first original document, and if the first original document has not been set when said designating means designates the identifying data, said plurality of other facsimile communication devices corresponding to the identifying data and from which the other image data should be transmitted are sequentially called and said other image data is caused to be sequentially transmitted from said other devices;

said facsimile communicating device further including group storage means for storing said identifying data of a plurality of said other facsimile communication devices and for storing a data group including a plurality of shortened number data each of which is associated with one of said other facsimile communication devices, wherein each of the shortened number data are read out from the group storage means and cause said designating means to sequentially designate said selected plurality when said group key means is operated;

means for detecting the unavailability of a said other facsimile communication device designated by said designating means, and means responsive to said unavailability detection for causing said designating means to designate identifying data associated with a substantial facsimile communication device for said detected unavailable device.

* * * * *